(12) United States Patent
Lagnado et al.

(10) Patent No.: US 8,074,065 B2
(45) Date of Patent: Dec. 6, 2011

(54) METHOD AND SYSTEM FOR DISPLAYING INFORMATION ON INSTALLED UNITS

(75) Inventors: Isaac Lagnado, Houston, TX (US); David A. Wissel, Tomball, TX (US); Walter R. Overcash, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 398 days.

(21) Appl. No.: 12/403,883

(22) Filed: Mar. 13, 2009

(65) Prior Publication Data

US 2010/0235616 A1      Sep. 16, 2010

(51) Int. Cl.
G06F 9/00      (2006.01)
G06F 3/00      (2006.01)
G06F 13/00      (2006.01)

(52) U.S. Cl. ........ 713/2; 713/1; 710/8; 710/15; 710/100
(58) Field of Classification Search ........... 713/1, 2; 710/8, 15, 100
See application file for complete search history.

(56) References Cited

U.S. PATENT DOCUMENTS

| | | | |
|---|---|---|---|
| 6,463,531 B1 * | 10/2002 | Aguilar et al. | 713/2 |
| 6,625,728 B1 * | 9/2003 | Ahrens et al. | 713/2 |
| 6,791,572 B1 * | 9/2004 | Cloney et al. | 345/619 |
| 6,944,687 B2 | 9/2005 | Doragh | |
| 6,993,645 B2 * | 1/2006 | Joseph et al. | 713/2 |
| 7,636,839 B2 * | 12/2009 | Lai et al. | 713/1 |
| 7,668,999 B2 * | 2/2010 | Nguyen et al. | 710/301 |
| 2003/0200372 A1 | 10/2003 | Doragh | |
| 2005/0074123 A1 * | 4/2005 | Cromer et al. | 380/270 |
| 2005/0239463 A1 | 10/2005 | Lagnado | |
| 2006/0089108 A1 | 4/2006 | Lagnado | |
| 2006/0276221 A1 | 12/2006 | Lagnado | |
| 2007/0076362 A1 | 4/2007 | Lagnado | |
| 2007/0079359 A1 | 4/2007 | Lagnado | |
| 2007/0085822 A1 | 4/2007 | Lagnado | |
| 2007/0092080 A1 | 4/2007 | Lagnado | |
| 2007/0093270 A1 | 4/2007 | Lagnado | |
| 2007/0176831 A1 | 8/2007 | Lagnado | |
| 2007/0178897 A1 | 8/2007 | Lagnado | |
| 2007/0218846 A1 | 9/2007 | Neill | |
| 2007/0254713 A1 | 11/2007 | Lagnado | |
| 2008/0161049 A1 | 7/2008 | Lagnado | |
| 2008/0182531 A1 | 7/2008 | Lagnado | |
| 2008/0270810 A1 | 10/2008 | Lagnado | |
| 2009/0037759 A1 | 2/2009 | Lagnado | |

* cited by examiner

Primary Examiner — Stefan Stoynov

(57) ABSTRACT

An exemplary embodiment of the present invention provides a method for providing information about units installed in a computing device. The method includes identifying an installed unit prior to an initialization of an operating system and obtaining information about the installed unit, wherein the information comprises a regulatory identification number, a manufacturer's logo, or a combination thereof. The method also includes receiving a request to provide information about the installed unit and providing the information about the installed unit.

19 Claims, 7 Drawing Sheets

METHOD AND SYSTEM FOR DISPLAYING INFORMATION ON INSTALLED UNITS

BACKGROUND

A computing device may generally have a number of labels or stickers attached to identify the specific units that are installed in the computing device. This includes both units installed by the manufacturer and units installed by a user, for example, a wireless card added as an upgrade. Some of these labels may be required by government regulations at the time of sale. For example, systems in use in the United States are required to have a Federal Communications Commission (FCC) ID label identifying any intentional radiators (radio transmitters) that are installed within the computing device. Similar requirements exist for other nationalities.

However, the labeling requirement may be burdensome in a production environment, as the FCC ID and other numbers may be received late in the production schedule. As the labels must be designed and in inventory prior to shipment of a computing device, this may delay production or shipping. Further, aftermarket units installed by a user are often accompanied by a label that may or may not be correctly applied to the computing device. If the label is not applied, then the computing device may not be in compliance with the regulations.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Figure 1:
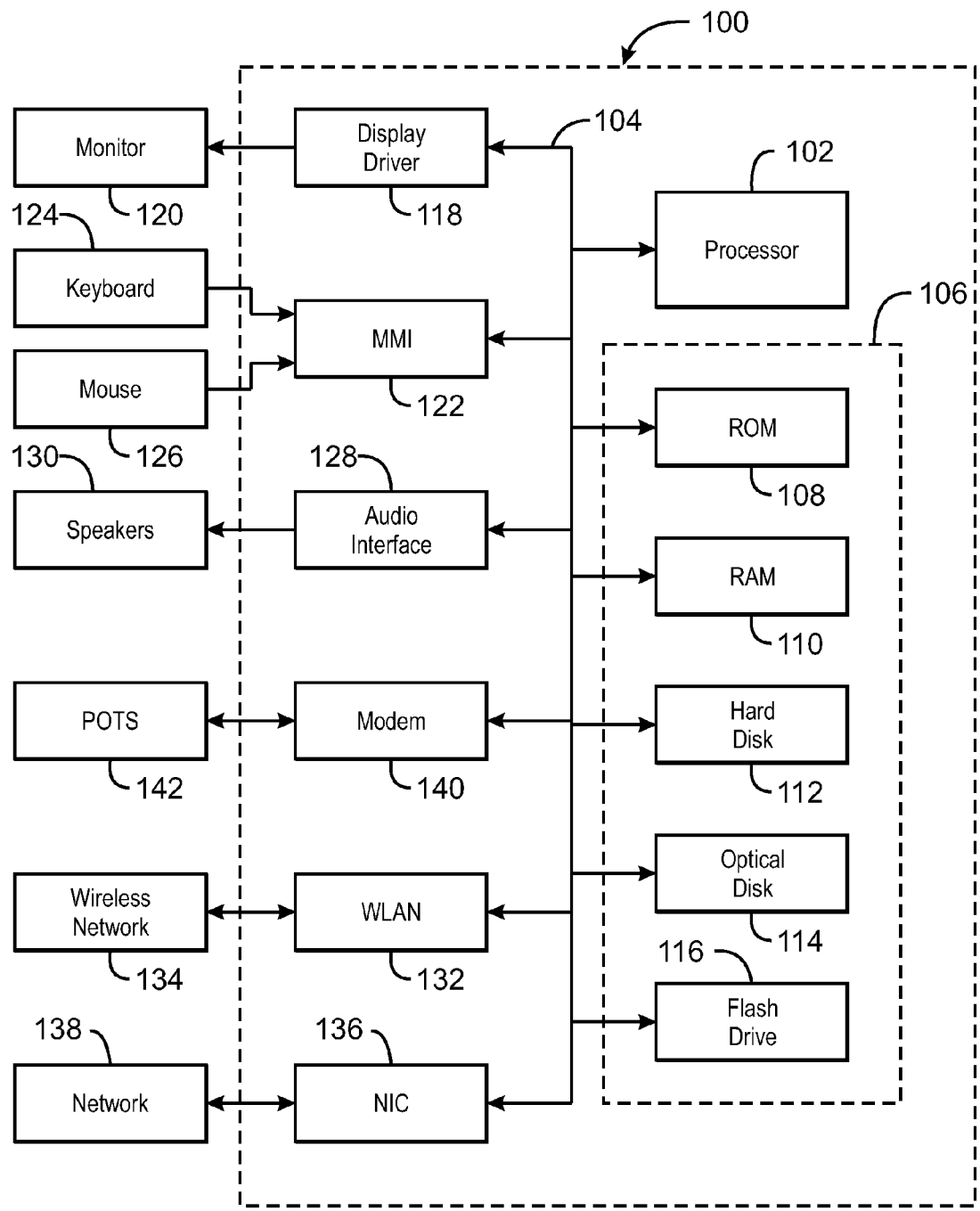
FIG. 1 is a block diagram of a computing device, in accordance with exemplary embodiments of the present invention.

Computer manufacturers use labels, placards, stickers, and other types of markings on computer cases to inform users about installed units. For example, the Federal Communications Commission (FCC) in the United States requires that an identification number (ID) be provided for every intentional radiator (radio-transmitter) that is installed in a computing device. Generally, this takes the form of labels applied to the outside of the computing device. However, delays in obtaining the FCC ID may lead to delays in acquiring the label and, thus, delays in shipping. This may lead to substantial costs for the manufacturer.

Computing devices may have different options installed during the production process. These differences may be caused by a supply chain requirement, for example, avoiding a single sourcing for a component, or may be caused by similar products that have different Stock Keeping Unit (SKU) numbers. The different multiply-sourced components and modules that may be installed in a computing device may require changes in the regulatory labeling as well, complicating the creation of a single standard regulatory label. Generally, the production facility will have separate labels for each possible configuration.

Techniques may exist within operating systems to access some information about installed units, for example, using the system manager in Microsoft Windows. However, operating system implementations provide no techniques for accessing information without the operating system present and, thus, are dependent on particular operating systems. Further, these systems do not generally display the regulatory ID information or other information that may be stored in a basic input-output system (BIOS) table.

Exemplary embodiments of the present invention provide systems and methods coupled to the hardware in a computing device for directly displaying information about installed units in a computing device. Specifically, in an exemplary embodiment of the present invention, a routine, which may be part of the BIOS, is used to access the internal buses in a computing device to obtain numerical identification numbers (IDs), and other information, from units installed on each of the buses. The IDs may be compared to a table of units that are allowed to be installed in the computing device (e.g., in a BIOS lock table) to determine information about the installed units. The information may include manufacturers' logos and regulatory identification, e.g., FCC IDs for intentional radiators installed in the computing device. The information may be displayed on screens accessed by interrupting the boot process. Alternatively, the user or manufacturer may select to have the information automatically displayed for a preselected period of time during the booting process.

The information that may be displayed is not limited to the information contained in a BIOS table. For example, in an exemplary embodiment of the present invention, corporate logos that may be stored on the installed unit may be displayed on the screen upon request or automatically during the boot-up process. The displayed logos may be used to identify the manufacturers of units used in the computing device, for example, under licensing agreements. Further, other types of information may also be displayed, including unit identification numbers, regulatory identification numbers for various nations or the like.

FIG. 1 is a block diagram of a computing device 100, in accordance with exemplary embodiments of the present invention. The computing device 100 may have a processor 1 02 for booting the computing device 100 and running other programs. The processor 102 does not have to be physically separate from other units in the computing device 100, as the computing device 100 may include application specific integrated circuits (ASICs), which combine numerous functions into a single chip. The processor 102 may use one or more buses 104 to communication with other functional units. The buses 104 may include both serial and parallel buses, which may be located fully within a case holding the computing device 100 or may extend outside of the case holding the computing device 100. For example, units may be coupled to the processor 102 through a Peripheral Component Interconnect (PCI) bus, a PCI Express bus (PCIe), an Industry Standard Architecture (ISA) bus, a Universal Serial Bus (USB), an Advance Graphics Port (AGP), a serial AT attachment (SATA) bus, or any number of other buses.

The computing device 100 will generally have computer readable media 106 for the processor 102 to store programs and data. The computer readable media 106 may include read only memory (ROM) 108, which may store programs for bootstrapping the computing device 100. The ROM 108 may include, for example, programmable ROM (PROM) and electrically programmable ROM (EPROM), among others. The computer readable media 106 may also include random access memory (RAM) 110 for storing programs and data during operation of the computing device 100. Further, the computer readable media 106 may include units for longer term storage of programs and data, such as a hard drive 112 or an optical disk drive 114. One of ordinary skill in the art will recognize that the hard drive 112 does not have to be a single unit, but may include multiple hard drives or a drive array. Similarly, the computing device 100 may include multiple optical drives 114, for example, CD-ROM drives, DVD-ROM drives, CD/RW drives, DVD/RW drives, Blu-Ray drives, and the like. The computer readable media 106 may also include flash drives 116, which may be, for example, coupled to the computing device 100 through an external USB bus.

The computing device 100 may have any number of other units attached to the buses 104 to provide functionality. For example, the computing device 100 may have a display driver 118, such as a video card installed on a PCI or AGP bus or a integral video system on the motherboard. The display driver 118 may be coupled to one or more monitors 120 to display information from the computing device 100. The computing device 100 may have a man-machine interface (MMI) 122 to obtain input from various user input devices, for example, a keyboard 124 or a mouse 126. The MMI 122 may include software drivers to operate an input device connected to an external bus (for example, a mouse connected to a USB), or may include both hardware and software drivers to operate an input device connected to a dedicated port (for example, a keyboard connected to a PS2 keyboard port). Other units may also be coupled to the computing device 100, for example, an audio interface 128, which may be used to drive speakers 130. The computing device 100 may be a server, a laptop computer, a desktop computer, a netbook computer, or any number of other computing devices 100. Further, the computing device 100 may be designed to allow the installation of new units, for example, a wireless access card.

Other units may be coupled to the buses 104 to allow the computing device 100 to communicate with external networks or computers. For example, a wireless local area network (WLAN) card 132 may be used to allow the computing device 100 to communicate with a wireless network 134. Similarly, a network interface controller (NIC) 136 may facilitate communications over an Ethernet connection between the computing device 100 and an external network 138, such as a local area network (LAN) or the Internet. Finally, a modem 140 may be coupled to one of the buses 104 to allow communications between the computing device 100 and a phone system (POTS) 142. Other units may also be installed, including, for example, a wireless wide-area network (WWAN) card (not shown) to allow the computing device 100 to access the Internet over a cellular phone system.

Figure 2:
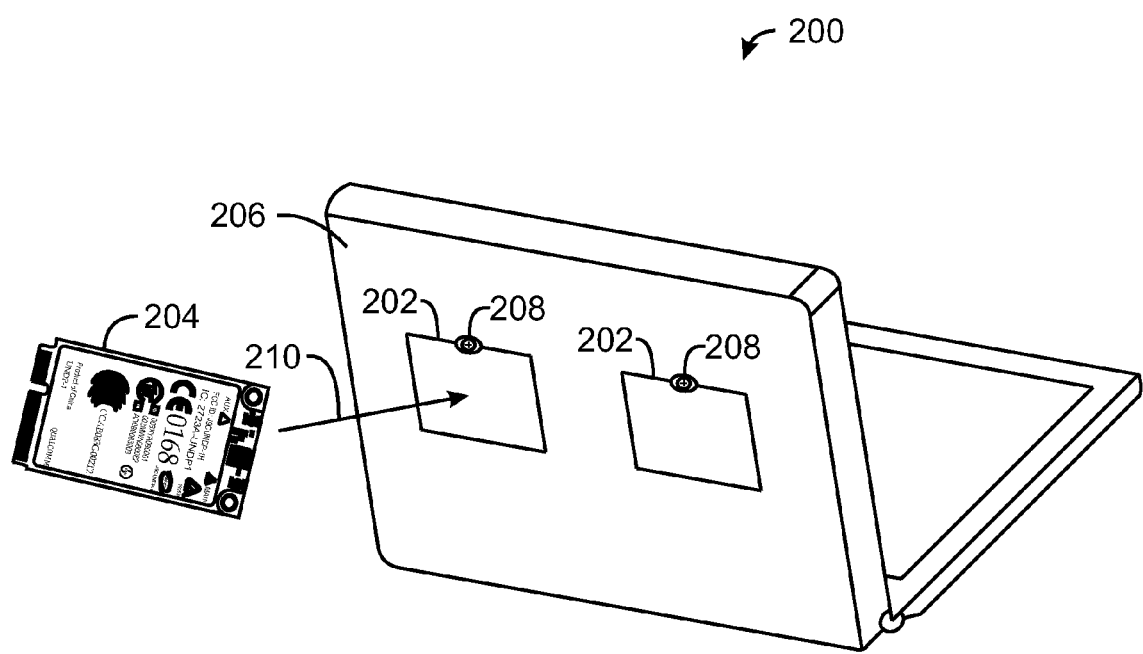
FIG. 2 is an illustration of a computing device showing access panels, which may be removed to install units, in accordance with exemplary embodiments of the present invention.

FIG. 2 is an illustration of a computing device 200 showing access panels 202, which may be removed to install units 204, in accordance with exemplary embodiments of the present invention. As shown in FIG. 2, the access panels 206 may generally be located on the bottom surface 206 of the computing device 200. The access panels 202 may be removed, for example, by removing a locking screw 208, to allow the unit 204 to be installed into the computing device 200, as indicated by reference numeral 210. The units 204 that may be installed under the access panels may include memory chips, CPUs, hard drives, WLAN transceivers, WWAN transceivers, Bluetooth transceivers, and the like. Many of these units have multiple regulatory identification numbers, for example, an intentional radiator may be licensed in each country of intended use.

Figure 3:
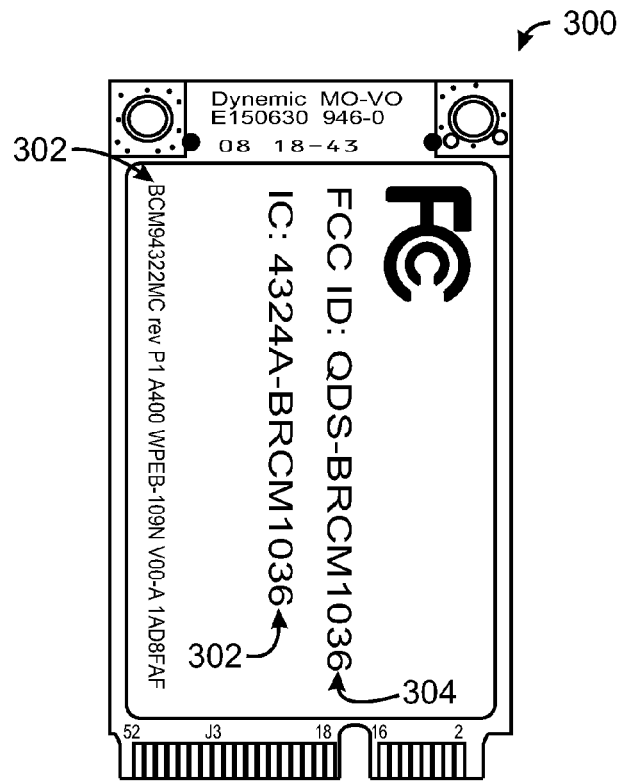
FIG. 3 is an illustration of an exemplary wireless network interface card that may be installed under an access panel in a computing device, in accordance with exemplary embodiments of the present invention.

FIG. 3 is an illustration of an exemplary wireless local area network (WLAN) card 300 that may be installed under an access panel in a computing device, in accordance with exemplary embodiments of the present invention. As can be seen in FIG. 3, the WLAN card 300 has numerous sets of identification numbers 302 that may indicate type, circuitry, antenna, broadcast strength, regulatory approval or the like. For example, one of the identification numbers 302 may be an FCC ID 304. The computing device may have a label for attachment on the outside of the case that indicates the FCC ID 304 of each of the intentional radiators installed in the device. The information on the label of the WLAN card 300 is not limited to the FCC ID 304 or other information specific to a single nation. For example, WLAN card 300 that are intended for use in multiple nations will generally have regulatory identification numbers for all relevant nations.

Figure 4:
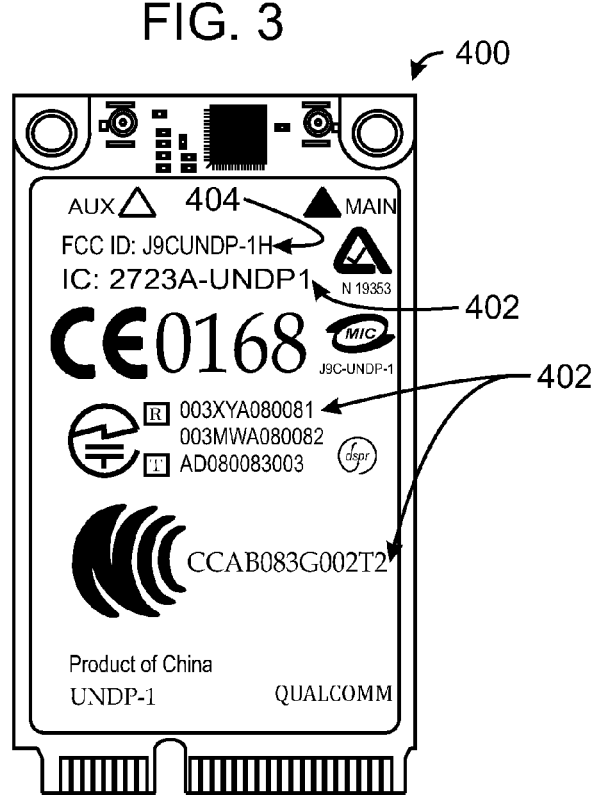
FIG. 4 is an illustration of an exemplary wireless wide-area network (WWAN) card that may be installed under an access panel in a computing device, in accordance with exemplary embodiments of the present invention.

FIG. 4 is an illustration of a WWAN card 400 that may be installed under an access panel in a computing device, in accordance with exemplary embodiments of the present invention. The WWAN card 400 shown in FIG. 4 may be configured for use in numerous countries and, thus, may have a larger number of identification numbers 402 than the WLAN card 300 shown in FIG. 3. The identification numbers listed on the card may include an FCC ID 404.

In addition to being printed on a label, the identification numbers for the cards 300 and 400 may be stored in a computer readable medium disposed inside the card. In an exemplary embodiment of the present invention, the computer readable medium inside the WLAN card may be read to determine the identification numbers, the FCC IDs, other identification numbers corresponding to other nations, and other relevant information. The information obtained from the cards may then be displayed by the computing device on an attached monitor during the boot process or upon entry of a key sequence.

In another exemplary embodiment of the present invention, one of the identification numbers 402 may be used to look up the FCC ID and other information in a table that is accessible to the BIOS. For example, the BIOS will often have a table (called a BIOS lock table) listing the units that are allowed to be installed in a particular computing device. If a unit is installed that is not on the list of permitted units in the BIOS lock table, the BIOS may halt the computer during the boot process or the BIOS may disable the unapproved unit prior to initiating the operating system. As above, the information in the BIOS lock table may be displayed by the computing device on an attached monitor during the boot process or upon entry of a key sequence.

Although the units discussed above are shown in the form of cards, one of ordinary skill in the art will recognize that exemplary embodiments are not limited to cards or, indeed, to units installed after manufacturing. For example, the units may be permanently mounted on the circuit board of the computing device or within the unit. However, even if permanently installed within the computing device, the units may still be accessed over a number of possible buses, for example, a PCI bus, a PCIe bus, a USB, a IEEE 1394 (firewire) bus, a SATA bus, and the like.

Figure 5:
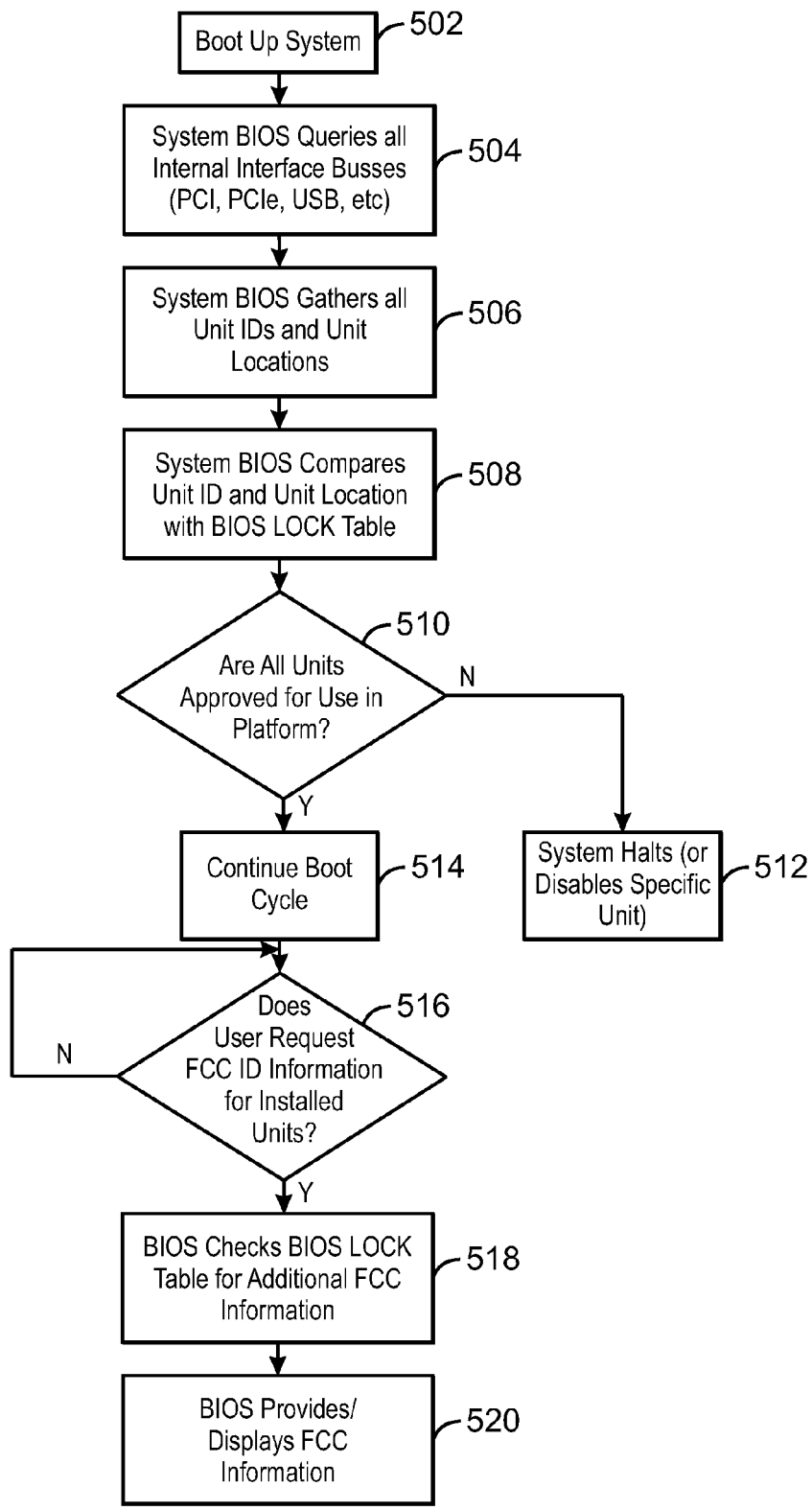
FIG. 5 is a process flow diagram of a method for displaying information about installed units upon user request, in accordance with exemplary embodiments of the present invention.

FIG. 5 is a process flow diagram of a method 500 for displaying information about installed units upon user request, in accordance with exemplary embodiments of the present invention. The method 500 begins at block 502 with the boot-up of the system. Prior to the loading of the operating system, the BIOS queries all interface buses at block 504 to determine the attached equipment. The identification numbers and unit location (for example, the Plug-n-Play (PnP) IDs, unit identification numbers, installation slot, and the like) are gathered by the BIOS at block 506. Process flow then proceeds to block 508, where the BIOS compares the ID numbers and unit locations with the information stored in the BIOS lock table. At block 510, a determination is made as to whether the units found by the BIOS are approved for use in the platform. If a unit is not approved for use in the platform, at block 512, the BIOS either halts the boot process or disables the unit. If the BIOS merely disables the unit at block 512, the process may resume at block 510 to check other installed units.

If the installed units are approved for use in the platform, or all non-approved units have been disabled, flow proceeds to block 514 to continue the boot cycle. At any point during the boot cycle, the booting process can be interrupted or temporarily halted by a user to enter further commands, as indicated at block 516.

If the user has requested information about the installed units, the BIOS obtains the relevant information on the installed units from the BIOS lock table at block 518. This may include both functional and disabled (non-approved) units, thus allowing the user to identify non-approved units that may be installed. At block 520, the information obtained from the BIOS lock table may be displayed. The BIOS is not limited to providing information on installed units only during the booting process. In an exemplary embodiment of the present invention, a keystroke sequence may be used to activate the BIOS set-up menu, allowing the BIOS to display system set-up information (including the regulatory information) at any point during operation of the computing device, for example, after the operating system has loaded.

Figure 6:
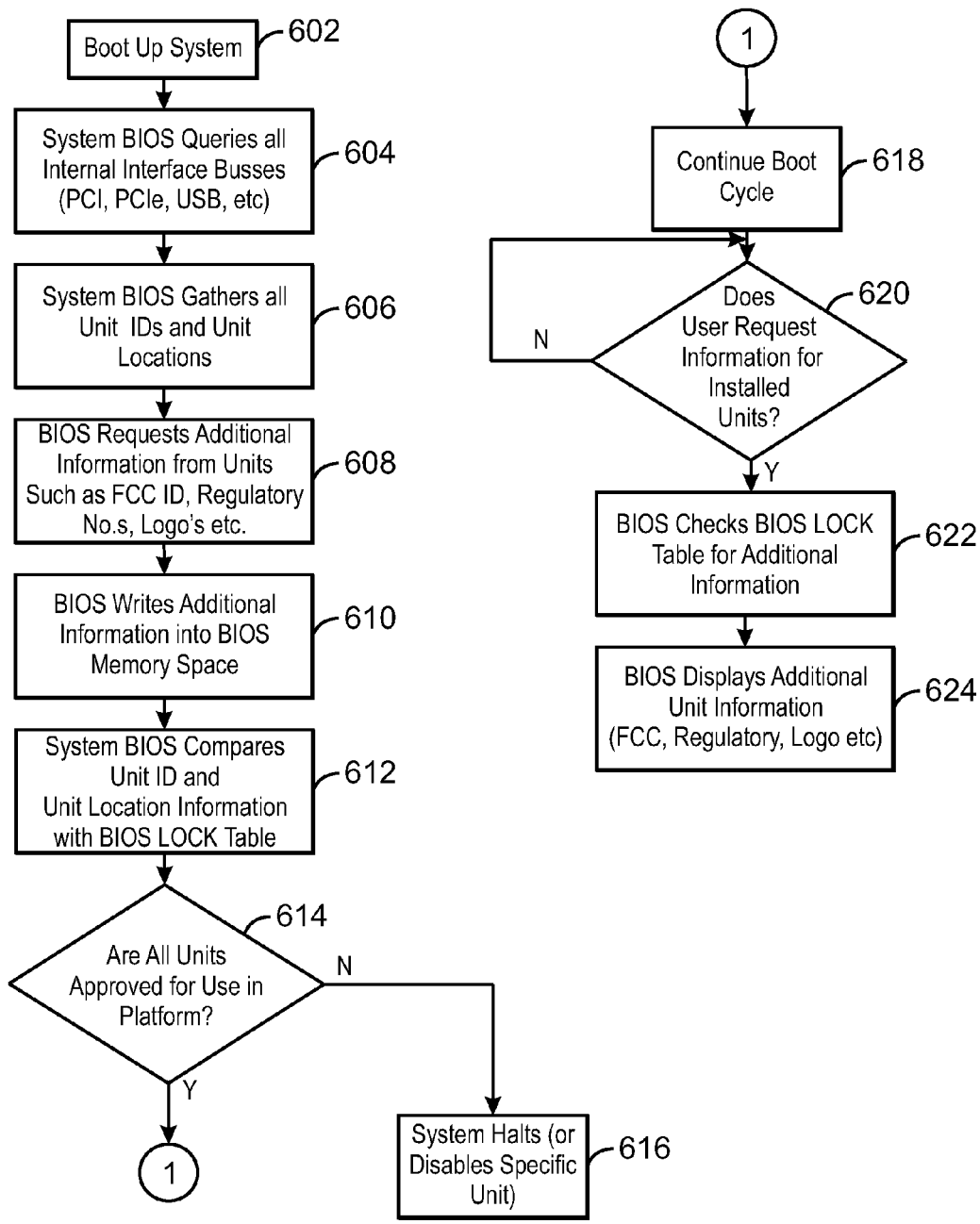
FIG. 6 is a process flow diagram of another method for displaying information about installed units upon user request, in accordance with exemplary embodiments of the present invention.

FIG. 6 is a process flow diagram of another method 600 for displaying information about installed units upon user request, in accordance with exemplary embodiments of the present invention. The method 600 begins with the booting of the system at block 602. At block 604, the BIOS queries the buses to identify attached units and, at block 606, the BIOS gathers the information on identification of the installed units.

However, unlike the method 500 discussed with respect to FIG. 5, in this exemplary embodiment, flow proceeds to block 608, where the BIOS requests additional information from the installed units. This information may include FCC IDs, regulatory numbers for other countries, manufacturer logos, regulatory agency logos, and the like. At block 610, the BIOS stores the additional information in the BIOS memory space for later use, for example, in added rows or columns in the BIOS lock table.

At block 612, the BIOS compares the device IDs to the information recorded in the BIOS lock table. At block 614, a determination is made for each installed unit as to whether the installed unit is approved for use in the platform. If the unit is determined to not be approved, the boot process may be halted or the non-approved unit may be disabled at block 616. After all non-approved units have been disabled, the boot process may continue at block 618. At block 620, a determination is made as to whether a user has requested that the BIOS display the information on installed units. At block 622, the BIOS may pull information from the BIOS lock table to be displayed along with the information obtained from the query of the installed units, as shown at block 624.

Figure 7:
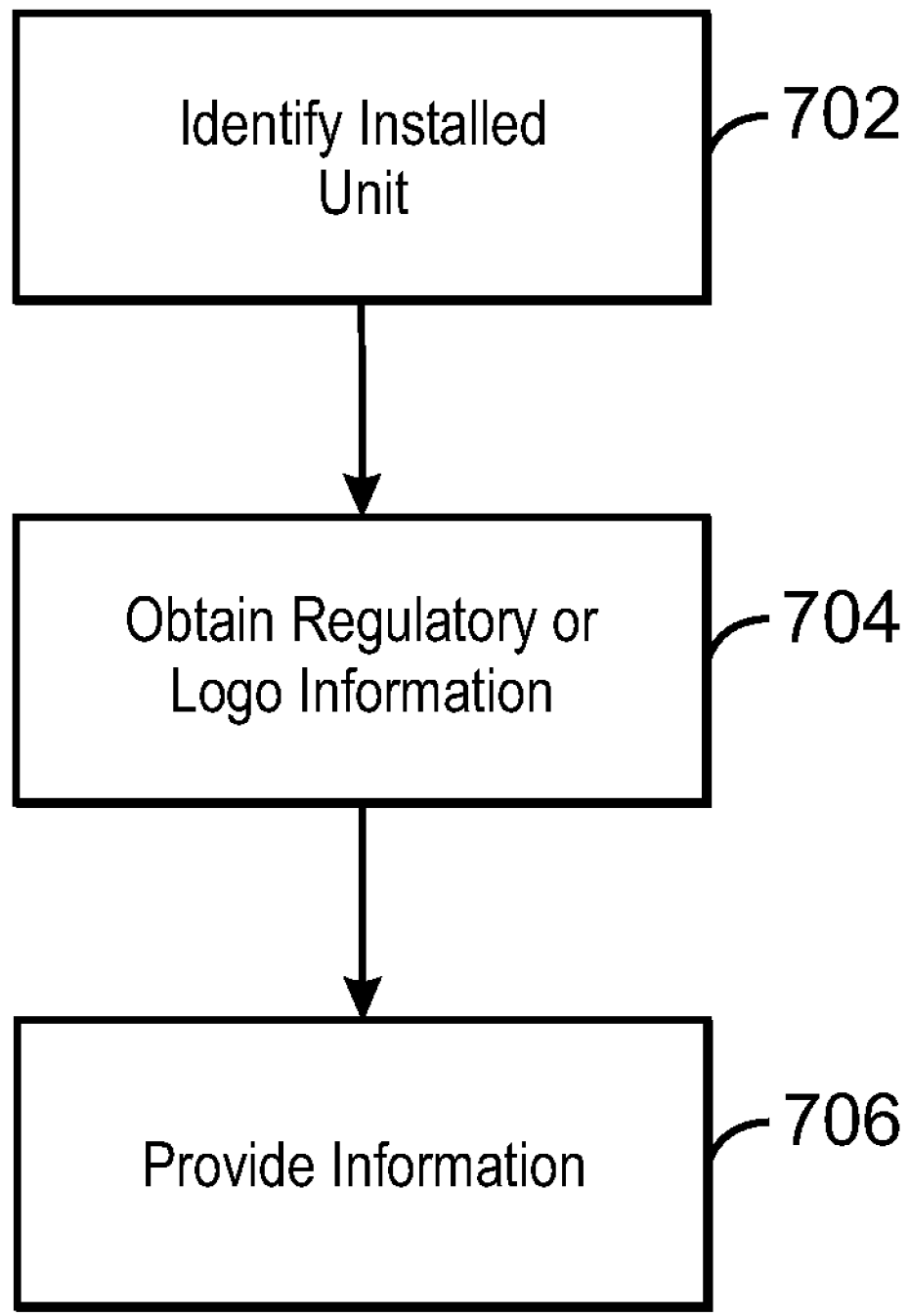
FIG. 7 is a process flow diagram of another method for displaying information about installed units upon user request, in accordance with an exemplary embodiment of the present invention.

FIG. 7 is a process flow diagram of another method for displaying information about installed units upon user request, in accordance with an exemplary embodiment of the present invention. The method begins at block 702 with the identification of an installed unit prior to an initialization of an operating system. As previously noted, the installed unit may be identified by querying one or more buses in a computing device. Information about the installed unit is obtained at block 704, wherein the information may include a regulatory identification number, a manufacturer's logo, and the like. Further, the information may be obtained from a table, for example, in the BIOS, or by querying the installed unit itself. At block 706, the information about the installed unit is provided, for example, to a user during the boot-up process or on a screen accessed during operations.

Figure 8:
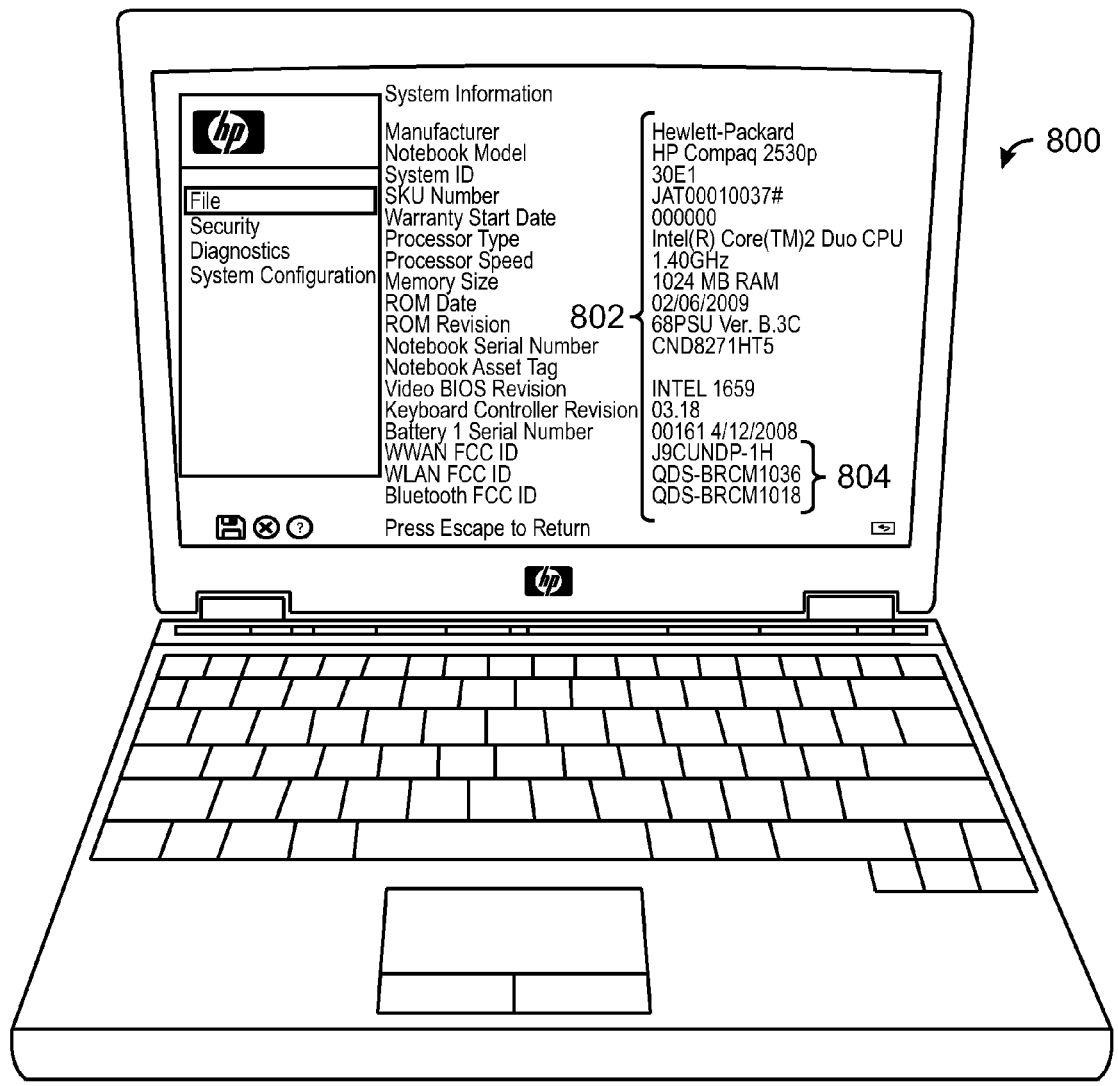
FIG. 8 is a screen shot of a computing device showing the display of information provided by the BIOS, in accordance with exemplary embodiments of the present invention.

FIG. 8 is a screen shot of a computing device 800 showing the display of information 802 provided by the BIOS, in accordance with exemplary embodiments of the present invention. In FIG. 7, the FCC IDs 804 for three installed radiators are shown, including a WWAN transceiver, a WLAN transceiver, and a Bluetooth transceiver. The units may reside in cards, as discussed with respect to FIGS. 3 and 4, may be built into the case of the unit, or may be connected through external bus connections, such as a USB port.

What is claimed is:

1. A method for providing information about a unit installed in a computing device, the method comprising:
   identifying an installed unit prior to an initialization of an operating system;
   obtaining information about the installed unit, wherein the information comprises regulatory information, licensing information, or a combination thereof, wherein the computing device does not have labels providing the information for at least a portion of the installed units; and
   displaying the information about the installed unit during a normal bootstrapping procedure.

2. The method of claim 1, comprising querying an internal bus to identify the installed unit.

3. The method of claim 1, wherein obtaining the information about the installed unit comprises obtaining the information from the installed unit, obtaining the information from a stored table of information about units that may be installed in the computing device, or both.

4. The method of claim 1, comprising receiving a user request to provide the information about the installed unit during the normal bootstrapping procedure.

5. The method of claim 1, comprising receiving a user request to provide the information about the installed unit by pressing a key sequence during normal operation of the computing device.

6. The method of claim 1, wherein displaying the information about the installed unit comprises displaying the information about the unit until the user chooses to move away from the information.

7. The method of claim 1, wherein displaying the information about the installed unit comprises automatically displaying the information for a preprogrammed period of time before moving away from the information.

8. A system for providing regulatory information, licensing information, or both, on installed units in a computing device, comprising:

the computing device, wherein the computing device does not have labels providing the regulatory information, the licensing information, or both for at least a portion of the installed units;

a computer readable medium comprising:

a basic input-output system configured to query a bus in the computing device to identify the installed units;

a table of information comprising the regulatory information, the licensing information, or both, on units that may be installed in the computing device; and a module configured to display the information on the installed units during a bootstrapping procedure; and a display configured to display the information from the module during the bootstrapping procedure.

9. The system of claim 8, wherein the bus comprises a Peripheral Component Interconnect (PCI) bus, a PCI Express bus (PCIe), an Industry Standard Architecture (ISA) bus, an extended ISA (EISA) bus, a Universal Serial Bus (USB), an Advance Graphics Port (AGP), or any combinations thereof.

10. The system of claim 8, wherein the units comprise memory chips, CPUs, hard drives, WLAN transceivers, WWAN transceivers, Bluetooth transceivers, or any combinations thereof.

11. The system of claim 8, wherein the module is configured to automatically display the information for a fixed period of time during the bootstrapping procedure.

12. The system of claim 8, wherein the module is configured to interrupt the bootstrapping procedure to display the information upon a request from a user.

13. The system of claim 8, wherein the table of information comprises a BIOS lock table.

14. The system of claim 8, wherein the information comprises regulatory identification numbers, manufacturers' logos, regulatory agency logos, or any combinations thereof.

15. A tangible, computer readable medium, comprising:

code configured to bootstrap a computer;

code configured to query a bus in a computing device to identify installed units, wherein the computing device does not have labels providing regulatory information, licensing information, or both for at least a portion of the installed units;

code comprising the regulatory information, the licensing information, or both on units that may be installed in the computing device; and code configured to display the information on the installed units during a bootstrapping procedure.

16. The tangible, computer readable medium of claim 15, comprising:

code configured to disable units that are not permitted to be installed in the computer.

17. The tangible, computer readable medium of claim 15, comprising:

code configured to interrupt the bootstrapping procedure and display the information upon a user request.

18. The tangible, computer readable medium of claim 15, wherein the regulatory information comprises a Federal Communication Commission identification number (FCC ID), a regulatory identification number, a unit identification number, or any combinations thereof.

19. The tangible, computer readable medium of claim 15, comprising:

code configured to display a manufacturer's logo for a unit that is installed in the computing device.

* * * * *